(12) United States Patent
Chahrouri (10) Patent No.: US 6,603,775 B1
(45) Date of Patent: Aug. 5, 2003

(54) DYNAMIC ALLOCATION OF COMMUNICATION RESOURCES WITHIN A COMMUNICATION SYSTEM

(75) Inventor: Gebran Chahrouri, Menlo Park, CA (US)

(73) Assignee: Aspect Communications Corporation, San Jose, CA (US)

( * ) Notice: Subject to any disclaimer, the term of this patent is extended or adjusted under 35 U.S.C. 154(b) by 0 days.

(21) Appl. No.: 09/057,967

(22) Filed: Apr. 9, 1998

(51) Int. Cl.$^7$ .................................................. H04J 3/16
(52) U.S. Cl. ...................... 370/468; 370/465; 370/224
(58) Field of Search ............................. 370/230, 352, 370/356, 401, 437, 468, 477, 395.42, 466, 414, 396, 391, 419, 233, 360, 462, 229; 709/240, 244

(56) References Cited

U.S. PATENT DOCUMENTS

| | | | | |
|---|---|---|---|---|
| 5,132,966 A | * | 7/1992 | Hayano et al. | 370/233 |
| 5,291,481 A | * | 3/1994 | Doshi et al. | 370/230 |
| 5,438,565 A | * | 8/1995 | Hemmady et al. | 370/335 |
| 5,473,604 A | * | 12/1995 | Lorenz et al. | 370/335 |
| 5,619,500 A | * | 4/1997 | Hiekali | 370/396 |
| 5,673,253 A | * | 9/1997 | Shaffer | 370/468 |
| 5,822,306 A | * | 10/1998 | Catchpole | 370/401 |
| 5,907,548 A | * | 5/1999 | Bernstein | 370/353 |
| 6,014,687 A | * | 1/2000 | Watanabe et al. | 709/204 |
| 6,058,111 A | * | 5/2000 | Beyda et al. | 370/360 |
| 6,069,890 A | * | 5/2000 | White et al. | 370/352 |
| 6,088,356 A | * | 7/2000 | Hendel et al. | 370/392 |
| 6,088,439 A | * | 7/2000 | Martz et al. | 370/230 |
| 6,122,364 A | * | 9/2000 | Petrunka et al. | 370/353 |
| 6,125,126 A | * | 9/2000 | Hallenst.ang.l | 370/522 |
| 6,130,933 A | * | 10/2000 | Miloslavky | 370/352 |
| 6,144,670 A | * | 11/2000 | Sponaugle et al. | 370/401 |
| 6,198,738 B1 | * | 3/2001 | Chang et al. | 370/352 |

* cited by examiner

Primary Examiner—Dang Ton
Assistant Examiner—Phuc Tran
(74) Attorney, Agent, or Firm—Blakely, Sokoloff, Taylor & Zafman LLP (57) ABSTRACT

A communication system comprising a first communication device configured to receive an audio based transaction, wherein the first communication device supplies formatted transaction data to a network through an associated communication link. Additionally, a plurality of alternate communication devices are coupled to the network through respective communication links associated with each of the alternate communication devices. At least one alternate communication device is configured to receive the formatted transaction data from the network through the associated respective communication link.

32 Claims, 6 Drawing Sheets

DYNAMIC ALLOCATION OF COMMUNICATION RESOURCES WITHIN A COMMUNICATION SYSTEM

FIELD OF THE INVENTION

The present invention relates to communication systems. More specifically, the present invention relates to the dynamic allocation of communication resources within a communication system.

BACKGROUND

Currently, communication systems, such as customer call centers, require the ability to route and service calls between different call centers which may be located in different geographical regions. For instance, if a receiving call center is unable to service a call, the receiving call center necessarily requires the ability to route the call to another call center capable of servicing the call. Currently, present communication systems utilize dedicated point-to-point communication links for interconnecting different call centers within a multiple call center system. The dedicated point-to-point communication links provide the medium for servicing and routing calls within the typical multiple call center system. For instance, in interconnected Automatic Call Distributor (ACD) systems and Public Branch Exchange (PBX) systems dedicated point-to-point communication links are utilized for routing a particular call or inquiry to other ACDs or PBXs within the system which are qualified to handle the call.

Figure 1:
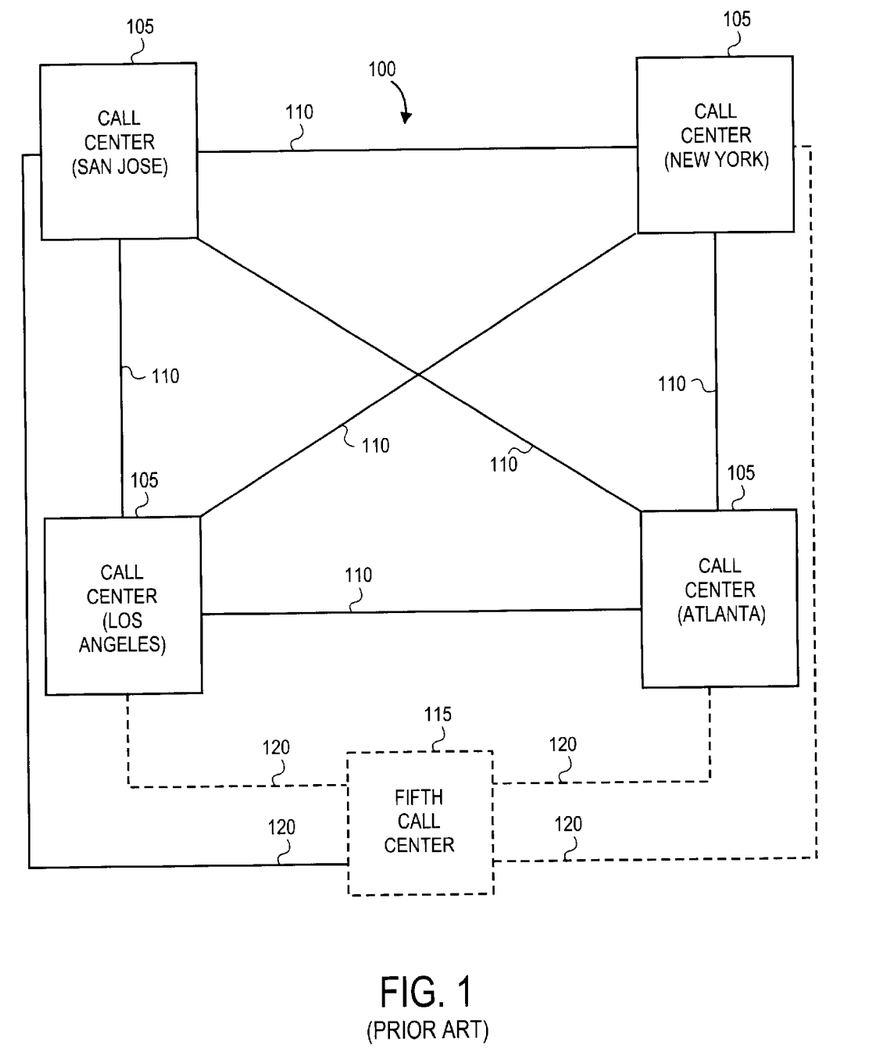
FIG. 1 illustrates a conventional communication system which utilizes dedicated point-to-point communication links between call centers.

A typical communication system 100 is illustrated in FIG. 1, wherein each call center or ACD 105 within the communication system 100 maintains a dedicated point-to-point communication link 110 with each of the other call centers 105 within the system 100. The dedicated point-to-point communication links 110 within the communication system 100 allow for communication or data transfer between one call center 105 and another call center 105. The typical communication system may contain many different call centers which are interconnected through a series different dedicated point-to-point communication links. The communication system 100, illustrated in FIG. 1, contains four separate call centers 105 which are interconnected through a series of six different dedicated point-to-point communication links 110 in order to provide full connectivity between each of the different call centers 105. Typically, each of these dedicated communication links 110 are implemented through a public network, which necessarily results in high utilization/operation costs. Accordingly, as a result of the high costs associated with dedicated communication links, some of the lesser utilized communication links between call centers may be omitted or removed from the system in order to reduce operating costs. Consequently, due to the removal of lesser utilized communication links, the overall ability to route calls to an appropriate call center within the system is diminished as the connectivity between each of the different call centers is constrained.

Each of the call centers within a typical communication system have a specified number of dedicated point-to-point communication links capable of handling a specified number of calls. Further, each of the communication links contain a fixed number of channels or connections, wherein each connection is configured to support a single call. For instance, as illustrated in FIG. 1, the New York call center 105 has three associated dedicated point-to-point communication links 110 which are connected to three different geographical call centers 105 (Los Angeles, Atlanta, and San Jose). Each of the dedicated point-to-point communication links 110 have a certain number of connections associated with each individual communication link 110, with each connection having the ability to handle or service a single call. For instance, the New York-San Jose communication link 110 may have five (5) connections, the New York-Los Angeles communication link 110 may have ten (10) connections, and the New York-Atlanta communication link 110 may have five (5) connections. Ideally, the communication links 110 between the different call centers 105 contain sufficient bandwidth or capacity (i.e.: connections) to manage traffic usage which occurs between different call centers 105.

During peak traffic, however, the amount of incoming calls in need of servicing may exceed the amount of connections within a communication link. For instance, in the above example, the New York-San Jose communication link 110 has five (5) connections, however, if a sixth call or connection between New York and San Jose call centers 105 is necessary, the sixth call would have to wait until one of the five (5) connections between New York and San Jose became available, even if the other fifteen (15) connections associated with the New York call center 105 were available. Therefore, even though the New York call center 105 has a total of twenty (20) available connections [New York-San Jose (5), New York-Los Angeles (10), and New York-Atlanta (5)], the system cannot dynamically allocate an additional connection, to handle the sixth call, from any of the other fifteen (15) available connections [New York-Los Angeles (10) and New York-Atlanta (5)] within the system 100. Therefore, the individual connections within the each of the respective communication links 110 between call centers 105 can not be dynamically allocated to handle unforeseen peak traffic between any two given call center sites.

Moreover, current communication systems, like the system in the present example, also have increased cost factors associated with the expansion of system capacity and capability. As the number of call centers within the system increases, the required dedicated point-to-point communication links necessary for proper connectivity between the call centers increases exponentially. For instance, in the example of FIG. 1, the system 100 is comprised of four separate call centers 105 that are interconnected through a series of six different dedicated point-to-point communication links 110 providing full connectivity between each of the different call centers 105. However, if an additional call center 115 (fifth call center) were added into the communication system 100, an additional four dedicated point-to-point communication links 120 would be needed, in addition to the six dedicated point-to-point communication links 110 already in the system 100, in order to provide full connectivity between each of the five different call centers. Therefore, as the need to expand system capabilities increases, the required dedicated point-to-point communication links necessary for proper connectivity between the call centers increases exponentially.

It is therefore desirable to provide a communication system having multiple call centers, wherein each call center utilizes a communication link capable of exchanging information and data with any or all associated call centers within the system. Further, it is desirable to provide a communication system wherein the communication links may be configured to dynamically allocate channels or connections, within each communication link, in order to handle different data, and varying data loads, which are transmitted to a variety of different designated call centers within the system.

SUMMARY OF THE INVENTION

The present invention is directed to a communication system comprising a first communication device configured to receive an audio based transaction, wherein the first communication device supplies formatted transaction data to a network through an associated communication link. Additionally, mutliple alternate communication devices are coupled to the network through respective communication links associated with each of the alternate communication devices. At least one alternate communication device is configured to receive the formatted transaction data from the network through the associated respective communication link.

In an alternate embodiment, the communication system incorporates a system control device which controls the amount of data entering the network from each of the respective communication devices coupled to the network.

BRIEF DESCRIPTION OF THE DRAWINGS

The present invention is illustrated by way of example in the following drawings in which like references indicate similar elements. The following drawings disclose various embodiments of the present invention for purposes of illustration only and are not intended to limit the scope of the invention.

DETAILED DESCRIPTION

The following detailed description sets forth numerous specific details to provide a thorough understanding of the invention. However, those of ordinary skill in the art will appreciate that the invention may be practiced without these specific details. In other instances, well-known methods, procedures, protocols, components, algorithms, and circuits have not been described in detail so as not to obscure the invention.

The present invention is directed to a communication system having multiple communication devices operating within a network environment, wherein each communication device utilizes a communication link capable of exchanging information and data with any associated communication devices within the network.

Throughout this detailed description of the invention, various embodiments are discussed that include the term network. The teachings of the present invention are applicable to any type of network, such as, but not limited to, intranet networks and internet networks. Further, any type of communication link or communication medium can be used to communicate information between two or more devices or between a device and a network. Although the present invention is described in terms of audio based transactions, such as telephony transactions, or audio/video teleconferencing transactions, the present invention can be applied to a variety of different data structures, such as the real-time sharing of data or computer applications. It is further understood that the various embodiments of the present invention can provide for the Network Inter-Queue (NIQ) of calls and data which are exchanged within a particular communication system.

Figure 2:
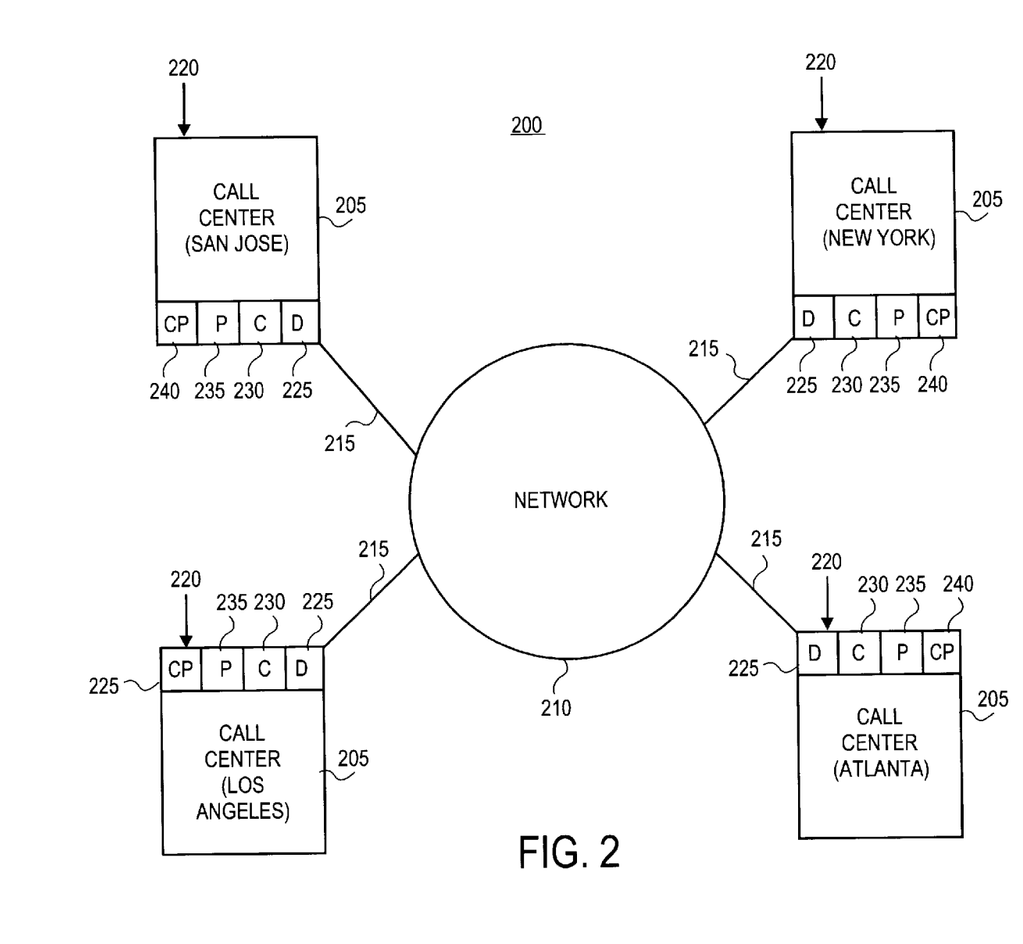
FIG. 2 illustrates an embodiment of a simplified block diagram illustrating an embodiment of a communication system capable of implementing the teachings of the present invention.

FIG. 2 is a simplified block diagram of an embodiment of a communication system capable of implementing the teachings of the present invention. The communication system 200, of FIG. 2, constitutes a series of individual communication devices 205 which are coupled to a network 210. Each of the communication devices 205 coupled to the network 210 share the available bandwidth on the network 210 for the transmission of data between the individual communication devices 205 coupled to the network 210. Accordingly, each individual communication device 205 is coupled to the network 210 through a respective communication link 215 located between each individual communication device 205 and the network 210. Further, each communication link 215 is comprised of a series of different channels or connections within the communication link 215, wherein each connection is configured to manage at least one individual transaction or call within a specified operating interval.

Each communication device 205 within the communication system 200 is configured to receive multiple of audio based transactions 220, such as, but not limited to, telephony transactions or audio/video teleconferencing transactions. The multiple audio based transactions 220 are then transformed by the respective communication devices into formatted transaction data 225 for transmission over the network 210. Accordingly, each communication device 205 is capable of transforming audio based transactions 220 into formatted transaction data 225 for transmission over the network 210. Moreover, each communication device 205 is capable of supplying formatted transaction data 225 to the network 210 and receiving formatted transaction data 225 from the network 210.

Each communication link 215 contains a fixed number of channels or connections, wherein each connection is configured to support a single call or data transaction per operating interval. Importantly, each communication device 205 is capable of dynamically allocating each connection in the series of different connections contained within the respective associated communication link 215 to transfer formatted transaction data 225 to any of the other communication devices 205 which are coupled to the network 210. Therefore, each individual communication device 205 can allocate any number of connections contained within an associated communication link 215 to handle data (formatted transaction data 225) transfer between any other communication devices 205 coupled to the network 210.

For instance, if a communication link 215 is comprised of fifteen connections, an associated primary communication device 205 (any communication device 205 receiving multiple audio based transactions 220 at any one instance) may allocate any number of the fifteen connections within the communication link 215 to handle data transfer between the primary communication device 205 and any other communication device 205 coupled to the network 210. It is understood that each communication link 215 can be configured to contain any desired amount of connections within the communication link 215.

Accordingly, the formatted transaction data 225 is supplied from any one of the communication devices 205 to the network 210 through an associated communication link 215. The formatted transaction data 225 supplied to the network 210 contains an address which is assigned by the communication device 205 (primary communication device) receiving the incoming audio based transactions 220. Alternately, the address could be supplied within the incoming audio based transactions 220. The address indicates the location of a desired alternate or secondary communication device 205 (any communication device 205 designated to receive. the formatted transaction data 225 at any one instance). Accordingly, the formatted transaction data 225 is supplied, across the network 210, to the secondary communication device 205 designated to receive the formatted transaction data 225, as dictated by the address assigned to the the formatted transaction data 225.

Moreover, each communication device 205 designated as a primary communication device 205 is capable of configuring and establishing the operating protocol which is maintained between the primary communication device 205 and a secondary communication device 205 designated to receive the formatted transaction data 225. Therefore, after the primary communication device 205 has determined the identity of the secondary communication device 205 designated to receive the formatted transaction data 225, the primary communication device 205 configures, establishes, and maintains the operating protocol between the primary communication device 205 and the secondary communication device 205.

Additionally, each communication device 205 operating as a primary communication device 205 can assign different signals or parameters to the formatted transaction data 225. For instance, the primary communication device 205 could apply a compression algorithm to the formatted transaction data 225 based upon a compression parameter 230 associated with the formatted transaction data 225. The compression parameter 230 would thereby allow the primary communication device 205 to compress specified or selected formatted transaction data 225 for the transmission over the network 210.

Moreover, each communication device 205 operating as a primary communication device 205 could assign the formatted transaction data 225 with a priority parameter 235. The priority parameter 235 allows the primary communication device 205 to reserve a specified portion of bandwidth within the network 210 for the transmission of the prioritized formatted transaction data 225.

Each communication device 205 within the system 200 is configured to have the ability to adjust the data flow traffic of other communication devices 205 within the system 200, based on a traffic control parameter 240 associated with each individual communication device 205. Accordingly, each communication device 205 within the communication system 200 can be assigned a traffic control parameter 240, with each traffic control parameter 240 indicating the priority of network use associated with a particular communication device 205. As such, the traffic control parameter 240 associated with each communication device 205 allows for the control of network data traffic, and allocation of network resources, by other communication devices 205 based on the importance of a particular communication device 205 within the system 200.

For instance, the New York communication device 205 can be assigned a traffic control parameter 240 of one (1), with the traffic control parameter 240 of one (1) indicating the highest priority relating to the transmission of data across the network 210. Alternately, the San Jose communication device 205 can be assigned a traffic control parameter 240 of two (2), with the traffic control parameter 240 of two (2) indicating the second highest priority relating to the transmission of data across the network 210. Therefore, based upon the traffic control parameters 240 assigned to each of the aformentioned communication devices 205, the New York communication device 205 [traffic control parameter 240 of one (1)] would accordingly have priority network use with respect the San Jose communication device 205 [traffic control parameter 240 of two (2)] and other lower priority communication devices 205 (i.e.: lower priority traffic control parameter 240) within the system 200. Accordingly, the formatted transaction data 225 supplied to the network 210 from the New York communication device 205 would have network use priority over formatted transaction data 225 supplied to the network 210 from the San Jose communication device 205.

Figure 3:
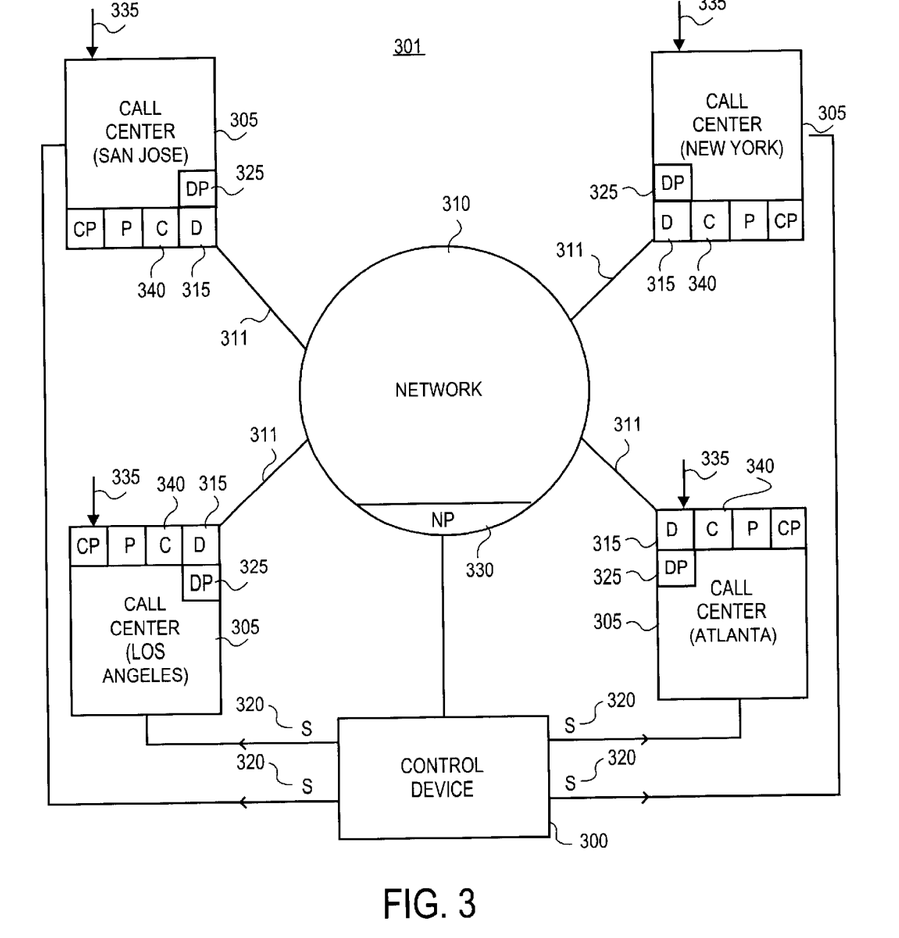
FIG. 3 illustrates an embodiment of a control device which may be incorporated into the communication system of FIG. 2.

FIG. 3 illustrates a control device 300 which may be incorporated into the communication system 200 of FIG. 2, in order to manage the allocation of network resources. In the communication system 301, as embodied in FIG. 3, the control device 300 is coupled to each of the respective communication devices 305, in addition to the network 310. Alternately, the control device 300 can be coupled to each of the respective communication devices 305 via the network 310 and the associated communication links 311. The control device 300 controls the transmission of data (formatted transaction data 315) across the network 310 from each of the respective communication devices 305. Each communication device 305 within the communication system 301 is configured to monitor and control the amount of formatted transaction data 315 being supplied to the network 310 based on a signal (S) 320 from the control device 300. Additionally, the control device 300 also monitors network resources, such as the available bandwidth within the network 310, to determine the network resources available to handle data traffic at any given time.

In one embodiment, the control device 300 can be configured to control the transmission of data 315 across the network 310 from each of the respective communication devices 305 based upon parameters associated with each of the respective communication devices 305. For instance, each of the respective communication devices 305 can be assigned a device parameter 325, similar to the traffic control parameters 240 of FIG. 2. Accordingly, each communication device 305 within the communication system 301 is assigned a device parameter 325, with each device parameter 325 indicating the priority of network use associated with a particular communication device 305. Accordingly, the communication device 305 which has an associated high priority device parameter 325 has higher priority network use with respect to the other communication devices 305 within the system 301 that have a lower priority device parameter 325. Correspondingly, the control device 300 controls the data (formatted transaction data 315) supplied to the network 310 from each of the respective communication devices 305 based upon the device parameter 325 associated with each of the respective communication devices 305.

In an alternate embodiment, the control device 300 is configured to control the transmission of data (formatted transaction data 315) across the network 310 from the respective communication devices 305 based upon network parameters 330 relating to network resources. For instance, the control device 300 is configured to monitor the available resources on the network 310 and control the amount of data (formatted transaction data 315) being supplied to the network 310 from each of the respective communication devices 305. If the control device 300 monitored an decrease in available network resources (i.e.: available bandwidth) the control device 300 could reduce the data (formatted transaction data 315) output associated with each communication device 305 in order to preserve resources and optimal operation of the network 310. Alternately, if the control device 300 monitored an increase in available network resources (i.e.: available bandwidth), the control device 300 could allow for an increase in the data (formatted transaction data 315) output associated with each communication device 305.

Moreover, in both control situations which use device parameters 325 and network parameters 330, the control device 300 could control the formatting applied to the multiple audio based signals 335 received by each communication device 305. For instance, the control device 300 could control compression ratios (i.e: compression parameters 340) applied to the audio based signals 335, through the respective communication devices 305, in order to modify the size of formatted transaction data 315 supplied to the network 310. For instance, if particular formatted transaction data 315 is of high priority or importance, the control device 300 could limit or eliminate any compression applied to the particular formatted transaction data 315, in order to preserve the signal quality of the data 315. Conversely, if particular formatted transaction data 315 is of low priority or importance, the control device 300 could increase the compression applied to the particular formatted transaction data 315 in order to preserve network resources.

Likewise, in instances where available network resources are low, the control device 300 could compress the formatted transaction data 315, through the respective communication devices 305, in order to reduce the size of formatted transaction data 315 supplied to the network 310 thereby conserving network resources. Conversely, in instances where available network resources are high, the control device 300 could reduce or eliminate any compression applied to the formatted transaction data 315 which would increase the signal quality of the formatted transaction data 315 supplied to the network.

Figure 4:
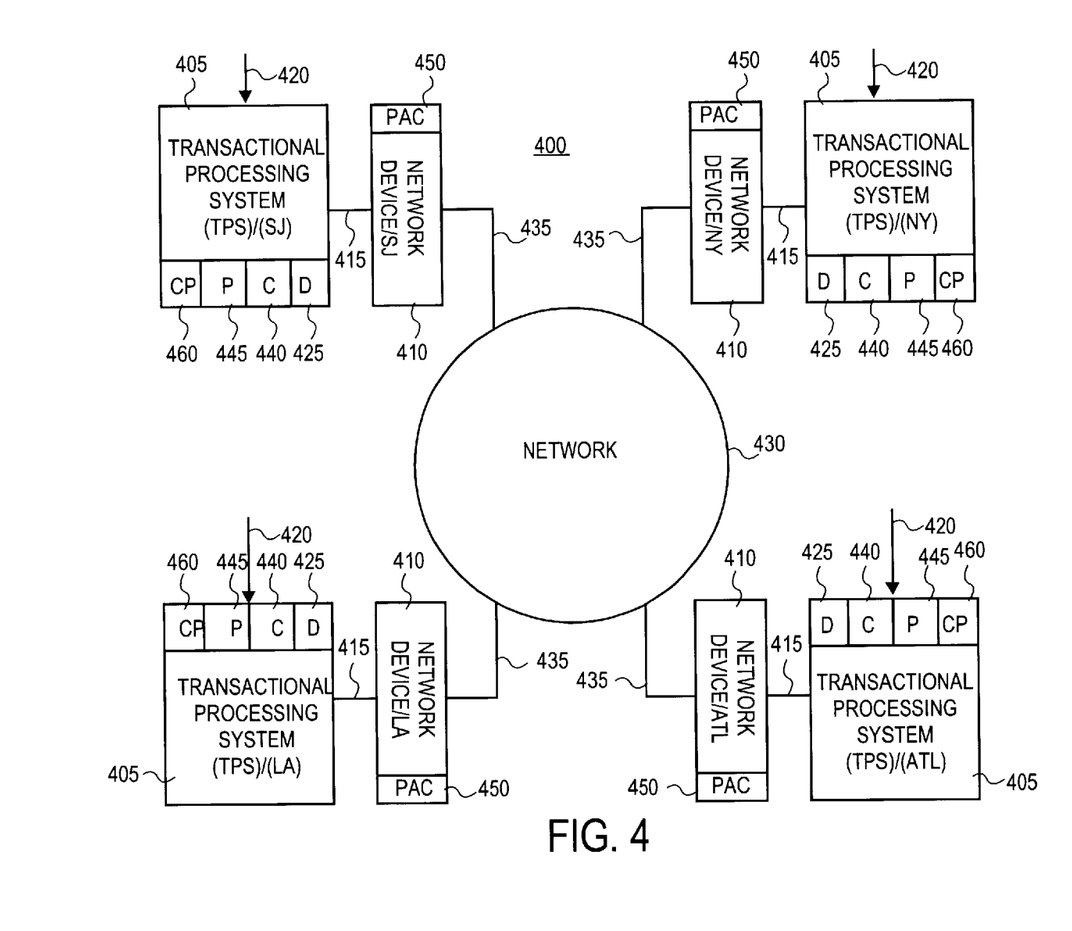
FIG. 4 illustrates an embodiment of a simplified block diagram illustrating an alternate embodiment of a communication system capable of implementing the teachings of the present invention.

FIG. 4 is a simplified block diagram of an alternate embodiment of a communication system capable of implementing the teachings of the present invention. In the communication system 400, illustrated in FIG. 4, each individual communication block is comprised of a transactional processing system (TPS) 405 coupled to a network device 410 through a local connection or local communication link 415. The local communication link 415 between the TPS 405 and the network device 410 can be implemented utilizing any type of communication link 415, such as a back to back T1 lines, PRI trunks, or a dedicated higher capacity link utilizing higher capacity connection cards between the TPS and a network device.

Each TPS 405 is configured to receive multiple audio based transactions 420, such as, but not limited to, telephony transactions or audio/video teleconferencing transactions, which are transformed by the TPS 405 into digitized data or digital transaction data 425. The digital transaction data 425 is then supplied, through the local communication link 415, to an associated network device 410 which processes the digital transaction data 425 for transmission over the network 430. The digital transaction data 425 is supplied to a primary network device 410 (any network device 410 receiving the digital transaction data 425 from a TPS 405 at any one instance) from a primary TPS 405 (any TPS 405 receiving the audio based transactions 420 at any one instance). The digital transaction data 425 contains an address, assigned by the primary TPS 405, indicating the location of a desired alternate or secondary TPS 405 (any TPS 405 designated to receive the digital transaction data 425 at any one instance). Alternately, the address could be supplied within the incoming audio based transactions 420.

The network devices 410 may be any device capable of formatting various types of data for transmission over a network environment. In one embodiment, the network device 410 constitutes a voice to internet protocol (VoIP) gateway. As such, each network device 410 is configured to receive the digital transaction data 420 from an associated TPS 405.

Accordingly, the digital transaction data 425 is supplied from the primary TPS 405 to an associated network device 410 through an associated local communication link 415. The associated network device 410 then supplies the digital transaction data 425 to the network 430 through communication link 435. Correspondingly, the digital transaction data is supplied to a secondary network device 410 (any network device 410 associated with a designated secondary TPS 405), through an associated communication link 435. The associated network device 410 then supplies the digital transaction data 425 to the secondary TPS 405, through an associated local communication link 415, which is designated to receive the digital transaction data 425.

Each communication link 435 contains a fixed number of channels or connections, wherein each connection is configured to support a single call or data transaction per operating interval. Importantly, each network device 410 is capable of dynamically allocating each connection in the series of different connections contained within the communication link 435 in order to transfer data (digital transaction data 425) to any of the network devices 410 which are coupled to the network 430. Therefore, each individual network device 430 can allocate any number of connections contained within the communication link 435 to handle data transfer (digital transaction data 425) between any other network devices 410 coupled to the network 430.

For instance, if a communication link 435 is comprised of fifteen connections, an associated primary network device 410 may allocate any number of the fifteen connections within the communication link 435 to handle data transfer (digital transaction data 425) between the primary network device 410 and any other network device 410 coupled to the network 430. It is understood that each communication link 435 can be configured to contain any desired amount of connections within the communication link 435.

Moreover, each network device 410 can process the digital transaction data 425 in a variety of different ways based upon different signals and parameters which may be associated with the digital transaction data 425. The different signals and parameters could be supplied by different devices, such as a TPS 405, a separate control device, or any other device which may be associated with the communication system 400. For instance, each network device 410 is configured to have the capability of compressing specified digital transaction data 425 which has been assigned a compression parameter or signal 440. Therefore, each network device 410 is configured to apply a compression algorithm to the digital transaction data 425 based upon a compression parameter or signal 440, thereby allowing the compression of specified digital transaction data 425 for subsequent transmission over the network 430.

Likewise, each network device 410 is configured to have the capability of reserving a bandwidth or resources on the network 430 for the transmission of specified digital transaction data 425 which has been assigned a priority parameter or signal 445. Therefore, each network device 410 can prioritize specified digital transaction data 425, based on an assigned priority parameter or signal 445, so as to allow for the reservation of a specified bandwidth on the network 430 for the transmission of the prioritized specified digital transaction data 425 over the network 430. Moreover, each network device 410 is configured to have the capability of transforming the digital transaction data 425 into data packets 450 which are suitable for transmission over the network 430. Likewise, each network device 420 is configured to have the capability of compressing or prioritizing specified digital transaction data packets 450 based on a corresponding parameter or signal being assigned to the specified digital transaction data packets 450.

Moreover, each network device 410 is configured to communicate with other network devices 410 within the communication system 400. Accordingly, a primary network device 410, which receives an incoming transaction (digital transaction data 425) from an associated TPS 405, determines the location of an alternate or secondary network device 410, based upon the address assigned to the transaction (digital transaction data 425). The primary network device 410 then configures, establishes, and maintains a connection with the secondary network device 410 for the transfer of data (digital transaction data 425) over the network 430.

Further, each network device 410 within the system 400 is configured to have the ability to adjust the data flow traffic of other network devices 410 within the system, based on a traffic control parameter 460 associated with each individual network device 410. Accordingly, each network device 410 within the communication system 400 can be assigned a traffic control parameter 460, with each traffic control parameter 460 indicating the priority of network use associated with a particular network device 410. The traffic control parameters 460 associated with each network device 410 allows for the control of data traffic across the network 430, and allocation of network resources, by other network devices 410 based on the importance of a particular network device 410 within the system 400.

For instance, the New York network device 410 can be assigned a traffic control parameter 460 of one (1), with the traffic control parameter 460 of one (1) indicating the highest priority relating to the transmission of data across the network 430. Alternately, the San Jose network device 410 can be assigned a traffic control parameter 460 of two (2), with the traffic control parameter 460 of two (2) indicating the second highest priority relating to the transmission of data across the network 430. Therefore, based upon the traffic control parameters 460 assigned to each of the network devices 410, the New York network device 410 [traffic control parameter 460 of one (1)] would accordingly have priority network use with respect the San Jose network device 410 [traffic control parameter 460 of two (2)] and other lower priority (i.e.: lower priority traffic control parameter 460) network devices 410 within the system 400. Accordingly, the formatted transaction data 425 supplied to the network 430 from the New York network device 410 would have network use priority over digital transaction data 425 supplied to the network from the San Jose network device 410.

Figure 5:
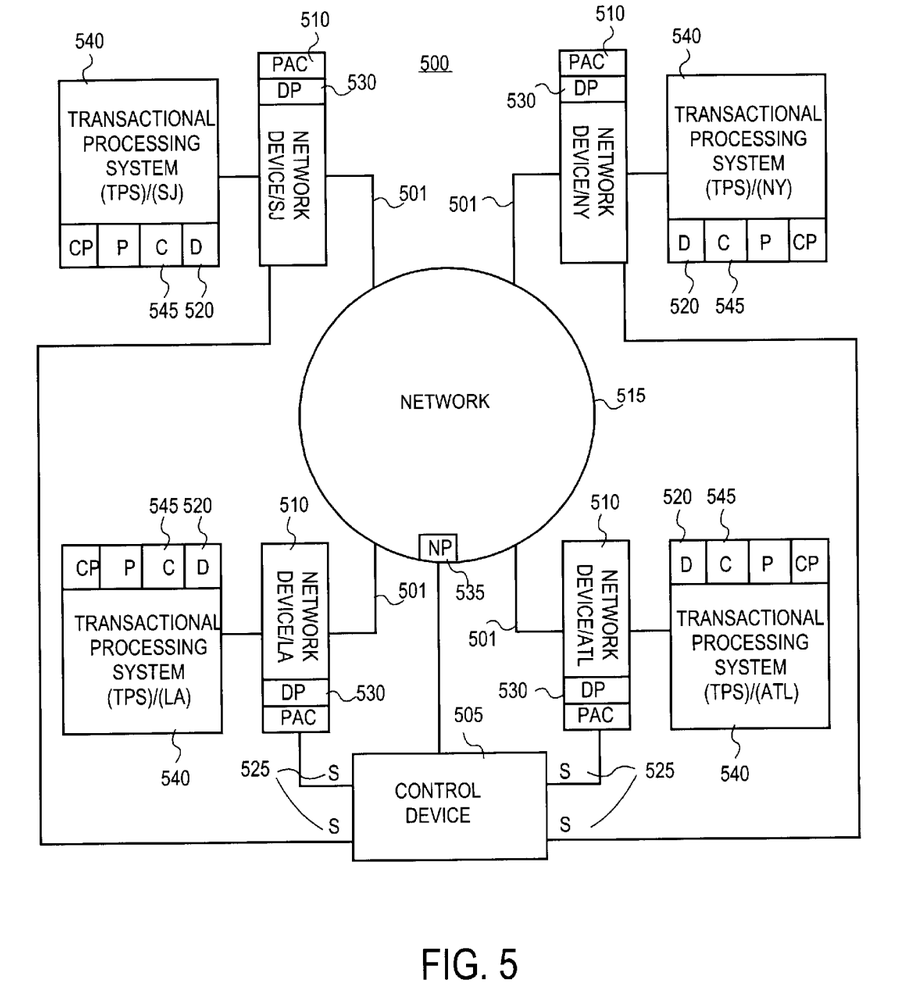
FIG. 5 illustrates an embodiment of a control device which may be incorporated into the communication system of FIG. 4.

FIG. 5 illustrates a control device 505 which may be incorporated into the communication system 400 of FIG. 4, in order to manage the allocation of network resources. In the communication system 500, as embodied in FIG. 5, the control device 505 is coupled to each of the respective network devices 510, in addition to the network 515. Alternately, the control device 505 can be coupled to each of the respective network devices 510 via the network 515 and the associated communication links 501. The control device 505 controls the transmission of data (digital transaction data 520) across the network 515 from each of the respective network devices 510. Each network device 510 within the communication system 500 is configured to monitor and control the amount of digital transaction data 520 being supplied to the network 515 based on a signal (S) 525 from the control device 505. Additionally, the control device 505 also monitors network resources, such as the available bandwidth within the network 515, to determine the network resources available to handle data traffic at any given time.

In one embodiment, the control device 505 can be configured to control the transmission of data (digital transaction data 520) across the network 515 from each of the respective network devices 510 based upon parameters associated with each of the respective network devices 510. For instance, each of the respective network devices 510 can be assigned a device parameter 530, similar to traffic control parameters 460 of FIG. 4. Accordingly, each network device 510 within the communication system 500 would be assigned a device parameter 530, with each device parameter 530 indicating the priority of network use associated with a particular network device 510. Accordingly, the network device 510 which has an associated high priority device parameter 530 would have priority network use with respect to the other lower priority communication devices 510 within the system 500. Correspondingly, the control device 505 would control the data supplied to the network 515 from each of the respective network devices 510 based upon the device parameter 530 associated with each of the respective network devices 510.

In an alternate embodiment, the control device 505 is configured to control the transmission of data across the network 515 from the respective network devices 510 based upon network parameters 535 associated with network resources. For instance, the control device 505 would be configured to monitor the available resources on the network 515, additionally, the control device 505 would be configured to control the amount of data being supplied to the network 515 from each of the respective network devices 510. If the control device 505 monitored an decrease in available network resources (i.e.: available bandwidth) the control device could reduce the data (digital transaction data 520) output associated with each network device 510 in order to preserve resources and optimal operation of the network 515. Alternately, the control device 505 could allow for an increase in the data (digital transaction data 520) output associated with each network device 510 if the control device 505 monitored an increase in available network resources (i.e.: available bandwidth).

Moreover, in both control situations which use device parameters 530 and network parameters 535, the control device 505 could control the formatting applied to the digital transaction data 520 which is received by a network device 510 from a respective TPS 540. For instance, the control device 505 could control compression ratios (compression parameters 545) applied to the digital transaction data 520 by the respective network devices 510 in order to modify the size of digital transaction data 520 supplied to the network 515. For instance, if particular digital transaction data 520 is of high priority or importance, the control device 505 could limit or eliminate any compression applied to the particular digital transaction data 520, in order to preserve the signal quality of the data 520. Conversely, if particular digital transaction data 520 is of low priority or importance, the control device 505 could increase the compression applied to the particular digital transaction data 520, in order to preserve network resources.

Likewise, in instances where available network resources are low, the control device 505 could compress the digital transaction data 520, through the respective network devices 510, in order to reduce the size of digital transaction data 520 supplied to the network 515, thereby conserving network resources. Conversely, in instances where available network resources are high, the control device 505 could reduce or eliminate any compression applied to the digital transaction data 520, which would increase the signal quality of the digital transaction data 520 supplied to the network 515.

Figure 6:
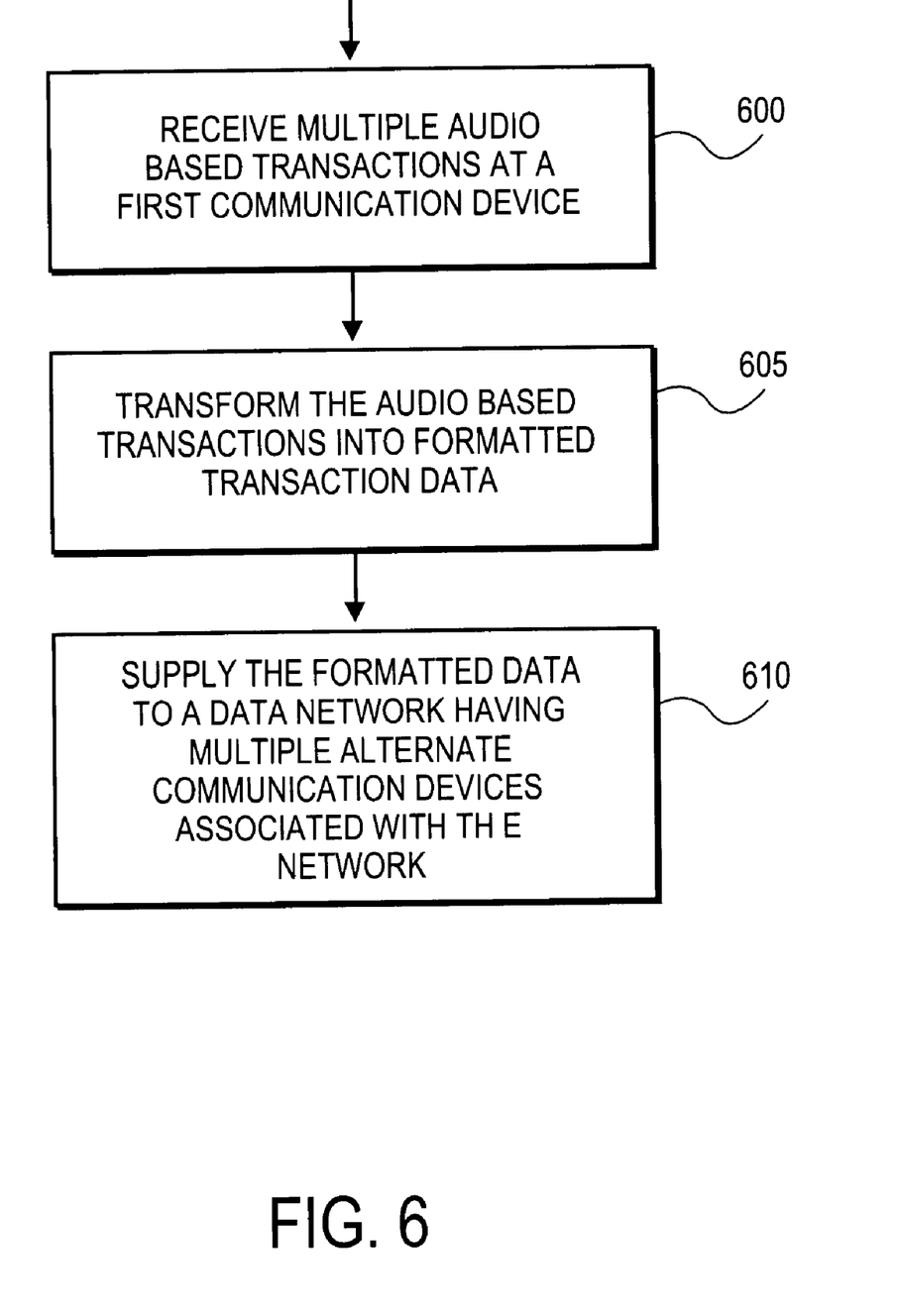
FIG. 6 illustrates a simplified flow diagram illustrating an embodiment of an operating procedure for an embodiment of a communication system capable of implementing the teachings of the present invention.

FIG. 6 is a simplified flow diagram illustrating an embodiment of an operating procedure for an embodiment of a communication system capable of implementing the teachings of the present invention. In operation, as illustrated in FIG. 6, the communication system receives multiple audio based transactions via a first or primary communication device at step 600. Each communication device is capable of communicating with other alternate communication devices coupled to the network, the network being comprised of an array of communication devices, wherein any of the communication devices may operate as an alternate or secondary communication device coupled to the network, in addition to the first or primary communication device. The primary communication device is capable of configuring at least one of the alternate or secondary communication devices to receive the formatted transaction data from the network.

Each communication device is capable of adjusting data traffic associated with other communication devices coupled to the network based on control parameters associated with each communication device coupled to the network. Each control parameter indicates the priority of network use associated with a particular communication device. Accordingly, the network device which has a high priority device parameter would, therefore, have priority network use with respect to the other communication devices having a lower priority device parameter.

At step 605, the array of audio based transactions are then transformed into formatted transaction data. For instance, the formatting step can transform the array of audio based transactions into digital transaction data. The formatted transaction data or digital transaction data may be assigned a priority parameter which allows for the reservation of bandwidth or resources on the network. Further, specified formatted transaction data or digital transaction data can be compressed based upon a compression signal being associated with the data.

Additionally, the digital transaction data can be transformed into corresponding digital transaction data packets suitable for transmission over the network. Further, the data packets can be assigned a priority parameter which allows for the reservation of bandwidth on the network for the prioritized data packets. Likewise, specified digital transaction data packets can be prioritized allowing for the reservation of bandwidth or resources on the network, based upon a corresponding priority parameter being associated with the data packets.

At step 610, the formatted transaction data is then supplied to the network through a communication link between the first or primary communication device and the data network. The formatted transaction data is addressed to at least one communication device (i.e.: alternate or secondary communication device) associated with the network which is configured to receive the formatted transaction data through an associated respective communication link.

A system control device may be included within the communication system, as illustrated in FIGS. 3 and 5, which controls the amount of data entering the network. Accordingly, the control device controls the amount of data entering the network based on parameters associated with each communication device coupled to the network. Additionally, the system control device may be configured to control the amount of data entering the network from each communication device based on parameters associated with the network resources. Further, the control device may be configured to control the formatting of the audio based transactions into the formatted transaction data based on network parameters.

From the above description and drawings, it will be understood by those of ordinary skill in the art that the particular embodiments shown and described are for purposes of illustration only and are not intended to limit the scope of the invention. Those of ordinary skill in the art will recognize that the invention may be embodied in other specific forms without departing from its spirit or essential characteristics. References to details of particular embodiments are not intended to limit the scope of the claims.

What is claimed is:

1. A communication system comprising:

a first communication device to receive an audio based transaction, wherein the first communication device supplies formatted transaction data to a network through an associated communication link; and a plurality of alternate communication devices which are coupled to the network through respective communication links associated with each alternate communication device, wherein at least one alternate communication device is to receive the formatted transaction data from the network through the associated respective communication link and wherein the formatted transaction data is assigned a priority parameter which allows for the reservation of bandwidth on the network for prioritized formatted transaction data and each communication device is to dynamically allocate connections contained within an associated respective communication link.

2. The communication system of claim 1, wherein each communication device is to receive an audio based transaction and each communication device is capable of supplying formatted transaction data to the network and receiving formatted transaction data from the network.

3. The communication system of claim 1, wherein the first communication device configures the at least one alternate communication device to receive the formatted transaction data from the network.

4. The communication system of claim 1, further comprising a system control device which controls the amount of data entering the network from each communication device coupled to the network.

5. The communication system of claim 4 wherein the system control device controls the amount of data entering the network based on parameters associated with each communication device coupled to the network.

6. The communication system of claim 4 wherein the system control device controls the amount of data entering the network from each communication device based on parameters associated with the network resources.

7. The communication system of claim 4, wherein the control device controls the formatting of the audio based transaction into the formatted transaction data based on parameters associated with the network resources.

8. The communication system of claim 1, wherein each communication device is capable of adjusting data traffic associated with other communication devices coupled to the network based on a control parameter associated with each communication device.

9. A communication system comprising:
a first transactional processing system to receive an audio based transaction;
a first network device coupled to the first transactional processing system, wherein the first network device supplies formatted transaction data to a network through an associated communication link; and
a plurality of alternate network devices which are coupled to the network through respective communication links associated with each alternate network device, wherein each alternate network device is coupled to a respective associated transactional processing system,
wherein at least one alternate network device is to receive the formatted transaction data from the network through a respective associated communication link and wherein the formatted transaction data is assigned a priority parameter which allows for the reservation of bandwidth on the network for prioritized formatted transaction data and each network device is to dynamically allocate connections contained within an associated respective communication link.

10. The communication system of claim 9, wherein each transactional processing system is to receive an audio based transaction.

11. The communication system of claim 9, wherein each network device is capable of supplying formatted transaction data to the network and receiving formatted transaction data from the network.

12. The communication system of claim 9 wherein the first network device configures the at least one alternate network device to receive the formatted transaction data from the network.

13. The communication system of claim 9, wherein each network devices comprises a voice to internet protocol gateway.

14. The communication system of claim 9, wherein each transactional processing system transforms the audio based transaction into digital transaction data.

15. The communication system of claim 14, wherein each network device compresses specified digital transaction data based on a signal from the transactional processing system.

16. The communication system of claim 14, wherein each network device transforms the digital transaction data into corresponding data packets suitable for transmission over the network.

17. The communication system of claim 9, further comprising a system control device which controls the amount of data entering the network from each network device coupled to the network.

18. The communication system of claim 17, wherein the system control device controls the amount of data entering the network from each network device based on parameters associated with each network device coupled to the network.

19. The communication system of claim 17, wherein the system control device controls the amount of data entering the network from each network device based on parameters associated with the network resources.

20. The communication system of claim 17, wherein the control device controls the formatting of the audio based transaction into the formatted transaction data based on parameters associated with the network resources.

21. The communication system of claim 9, wherein each network device is capable of adjusting data traffic associated with other network devices coupled to the network based on a control parameter associated with each network device.

22. A method of communicating transactions, the method including:
receiving an audio based transaction at a first communication device;
transforming the audio based transaction into formatted transaction data; and
supplying the formatted transaction data to a data network through an associated communication link coupled between the first communication device and the data network, the network having a plurality of alternate communication devices associated with the network,
wherein at least one alternate communication device associated with the network is to receive the formatted transaction data through a respective associated communication link and wherein the formatted transaction data is assigned a priority parameter which allows for the reservation of bandwidth on the network for prioritized formatted transaction data and each communication device is to dynamically allocate connections contained within an associated respective communication link.

23. The method of claim 22, wherein each communication device comprises a transactional processing system coupled to a network device.

24. The method of claim 22, wherein the transforming comprises transforming the audio based transaction into digital transaction data.

25. The method of claim 22, further comprising compressing specified digital transaction data based on a compression signal.

26. The method of claim 22, further comprising transforming the digital transaction data into corresponding data packets suitable for transmission over the network.

27. The method of claim 22, wherein the first communication device configures the at least one alternate communication device to receive the formatted transaction data from the network.

28. The method of claim 22, wherein each communication device is capable of adjusting data traffic associated with other communication devices coupled to the network based on a control parameter associated with each communication device.

29. The method of claim 22, further comprising a system control device which controls the amount of data entering the network.

30. The method of claim 29, wherein the system control device controls the amount of data entering the network from each communication device based on parameters associated with each communication device coupled to the network.

31. The method of claim 29, wherein the system control device controls the amount of data entering the network from each communication device based on parameters associated with the network resources.

32. The method of claim 29, wherein the control device controls the formatting of the plurality of audio based signals into the formatted transaction data based on system parameters.

* * * * *